(12) United States Patent
Bellanger

(10) Patent No.: US 6,479,747 B2
(45) Date of Patent: Nov. 12, 2002

(54) ACCESSORY FOR FITTING TO THE BASE SECTION OF TRUNKING FOR ROUTING ELECTRICAL CABLES OR CONDUCTORS

(75) Inventor: Jérôme Bellanger, Le Mans (FR)

(73) Assignees: Legrand, Limoges (FR); Legrand SNC, Limoges (FR)

(*) Notice: Subject to any disclaimer, the term of this patent is extended or adjusted under 35 U.S.C. 154(b) by 0 days.

(21) Appl. No.: 09/816,411

(22) Filed: Mar. 26, 2001

(65) Prior Publication Data

US 2001/0023768 A1 Sep. 27, 2001

(30) Foreign Application Priority Data

Mar. 24, 2000 (FR) ................................. 0003787

(51) Int. Cl.[7] .................................................. H01J 5/00
(52) U.S. Cl. ........................ 174/50; 174/50.51; 174/98
(58) Field of Search ............................ 174/48, 19, 49, 174/50, 50.51, 50.52, 50.53, 65 R, 66, 68.1, 68.3, 95, 98

(56) References Cited

U.S. PATENT DOCUMENTS

| 4,627,469 A | * | 12/1986 | Buard | ........................ 138/92 |
| 5,024,614 A | * | 6/1991 | Dola et al. | .................... 439/114 |
| 5,406,762 A | * | 4/1995 | Buard | ........................ 52/287.1 |
| 5,939,670 A | * | 8/1999 | Shteynberg et al. | .......... 174/49 |
| 5,981,872 A | * | 11/1999 | Decore et al. | ............... 174/101 |

FOREIGN PATENT DOCUMENTS

| DE | 89 04 318 | | 8/1989 | |
| EP | 0 414 616 | | 2/1991 | |
| EP | 0 734 107 | | 9/1996 | |
| FR | 2 651 387 A | * | 8/1989 | ............. H02G/3/06 |
| FR | 2 772 200 A | * | 12/1997 | ............. H02G/3/06 |
| GB | 2310546 | * | 8/1997 | ............. H02G/3/04 |

* cited by examiner

Primary Examiner—Dean A. Reichard
Assistant Examiner—William H. Mayo, III
(74) Attorney, Agent, or Firm—Young & Thompson

(57) ABSTRACT

An accessory for attaching to a base section of trunking for routing electrical cables or conductors includes a joint inside the trunking for masking any longitudinal gap beyond an edge of a length of cover section. The joint includes an elastically deformable wall which deforms elastically between a first configuration in which at least a portion of the wall is at the same level as the cover section and a second configuration in which the wall is at a lower level than the cover section.

11 Claims, 2 Drawing Sheets

ACCESSORY FOR FITTING TO THE BASE SECTION OF TRUNKING FOR ROUTING ELECTRICAL CABLES OR CONDUCTORS

BACKGROUND OF THE INVENTION

1. Field of the Invention

The present invention relates generally to accessories for attaching to the base section of trunking for routing electrical cables or conductors and in particular to accessories referred to as finishing accessories which assure continuous protection of the cables at interruptions between lengths of cover section closing the trunking where a device is fitted, at the end of the trunking or at a corner.

The invention relates more .particularly to an accessory which is attached to the base section of trunking for routing electrical cables or conductors incorporating a joint inside the trunking for masking any longitudinal gap beyond an edge of at least one length of cover section.

2. Description of the Prior Art

French patent 2 651387 describes an accessory of the above kind in which the joint is a plane wall adapted to be positioned under adjacent lengths of cover section to close any gap between the cut edges of the lengths of cover section if they are not cut accurately.

This kind of joint therefore prevents the passage of any kind of object between the two lengths of cover section and assures continuous insulation so that the trunking conforms to applicable standards.

Although the above kind of joint is entirely satisfactory, in particular from the point of view of conformance of the trunking to the applicable standards, and equally, for trunking installers, in terms of the speed of fitting it, to which this parameter contributes, it is not always suitable from the esthetic point of view, especially if the trunking is relatively wide.

In this case, the lengths of closure cover section are also wide and are even more difficult to cut because this can make the cut edges more skewed.

The gap between juxtaposed lengths of cover section can therefore be relatively large, clearly showing the joint, which mars the finished esthetic appearance of the trunking.

To overcome the drawback referred to above, especially for wide trunking, it has already been proposed to associate with the joint a joint-cover which covers the joint and the cut edges of the lengths of cover section, which can therefore be cut without taking special care.

To facilitate fitting the joint-cover, a joint-cover support can be used that generally incorporates at each end, covered by a length of cover section, a step running across the whole of its width and against which the respective length of cover section abuts.

This kind of support is described in published French patent application 2 772 200 in particular.

This kind of solution is satisfactory from the point of view of conformance of the assembly to the applicable standards, and also from the esthetic point of view if the joint-cover reproduces the external appearance and colorway of the cover section of the trunking.

European patent 0 630 090 discloses sandwiching two successive lengths of cover section between a joint on the inside and a joint-cover on the outside, the joint having a portion that locates between the two lengths of cover section.

The accessory described in European patent 0 630 090 is complex to manufacture and use and its main drawback is the fact that the unesthetic projection of its joint-cover deters some installers, who continue to prefer to install trunking with no accessories and therefore not conforming to the applicable standards.

If the cover section of the trunking has a decorative pattern formed during extrusion or by reworking, for example by applying a coating imitating various textures, such as that of wood, stone or the like, the presence of an injected joint-cover at the interruption in the cover section, even if its color coordinates with that of the decoration of the cover section, is not always to the taste of the installer, who prefers to install contiguous lengths of cover section carefully cut to the correct length.

Compared to the technique mentioned above, the present invention proposes a new low-cost accessory for attaching to the base section of trunking for routing electrical cables or conductors that is simple to manufacture and provides the installer with a marker for locating the cut edges of the lengths of cover section or other members to be juxtaposed along the length of the base section, enabling the installer to choose whether to cover the cut edges with a joint-cover or not, according to the care with which the installer wishes to cut said lengths of cover section or other members, and the esthetics required for the installation as a whole.

SUMMARY OF THE INVENTION

The invention provides an accessory for attaching to a base second of trunking for routing electrical cables or conductors. The accessory includes a joint inside the trunking for masking any longitudinal gap beyond an edge of a length of covered section. The joint includes an elastically deformable wall adapted to deform elastically between a first configuration in which at least a portion of the wall is at the same level as the cover section and a second configuration in which the wall is at a lower level than the cover section.

Consequently, in accordance with the invention, at an interruption in the cover section closing the trunking that requires the installer to cut the cover section into lengths, if the installer decides to install a joint-cover, he uses the wall forming the joint when in its first configuration. More particularly, the part of that wall at the level of the cover section, to measure the appropriate lengths of cover section to be cut so that the cut edges of the lengths of cover section, when they are fitted to the base section of the trunking, locate against this wall portion forming the joint, leaving between them at most a gap reduced to the width of the wall forming joint. Then, on positioning the joint-cover on the wall forming the joint, the wall deforms elastically into its second configuration in which it is deformed under the joint-cover and moves to a level lower than that of the cover section, to be more precise a level between the cover section and the base second of the trunking.

If the installer does not wish to use a jointcover, he can nevertheless use the accessory according to the invention as a joint, which deforms elastically under the two lengths of closely spaced cover section from its first configuration to its second configuration, as explained above.

Other advantageous and non-limiting features of the accessory according to the invention are set out hereinafter.

The accessory in accordance with the invention being associated with a cover section of bulging shape, the wall forming the joint has a plane shape in its first configuration and a bulging shape in its second configuration espousing that of the associated cover section.

The accessory in accordance with the invention being associated with a cover section of essentially plane shape, wherein the wall forming the joint has a bulging shape in its first configuration and an essentially plane shape in its second configuration espousing that of the associated cover section.

The wall forming the joint carries on an inside face, which faces towards the back of the cover section of the trunking, attachment means for attaching it onto an edge of a partition of the base section. The attachment means can be in the form of clipping means, preferably including two facing tongues projecting from the inside face of the wall forming the joint and inclined thereto.

The accessory includes a joint-cover adapted to cover the wall forming the joint and the edge of the length of cover section and an edge of another member, the edges being positioned on either side of the joint to form a continuous outside wall between the length of cover section and the member.

In this embodiment the wall forming the joint in its second configuration is shorter than the joint-cover so that it leaves uncovered the ends of the joint-cover which carry clips which clip into groove means provided on the base section.

The joint-cover advantageously has a shape espousing that of the length of cover section.

The wall forming the joint extends over a greater part of the width of the base section of the trunking.

The wall forming the joint is molded from a plastics material.

The following description, which is given by way of non-limiting example and with reference to the accompanying drawings, explains in what the invention consists and how it can be put into effect.

DETAILED DESCRIPTION OF THE PREFERRED EMBODIMENTS

Figure 1:
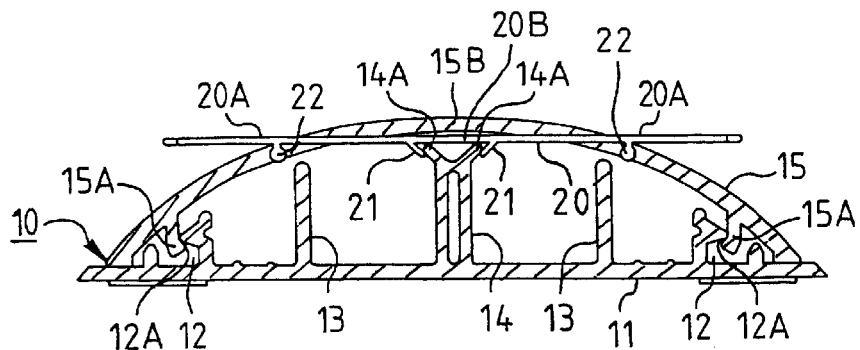
FIG. 1 is an end view of an accessory according to the invention positioned on a trunking base section with the wall forming the joint of the accessory in a first configuration.
Figure 2:
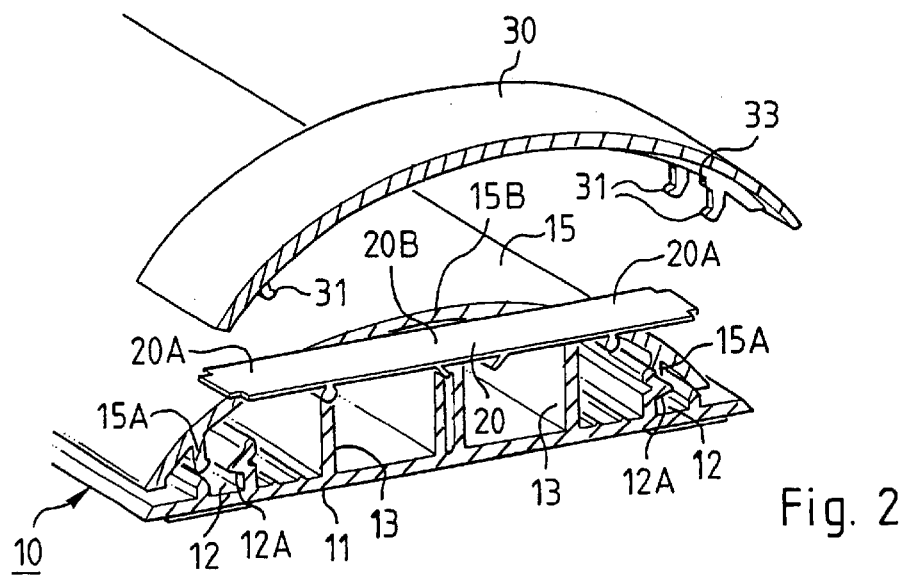
FIG. 2 is a top perspective view relative to FIG. 1 with the associated joint-cover positioned over the wall forming the joint of the accessory according to the invention.
Figure 3:
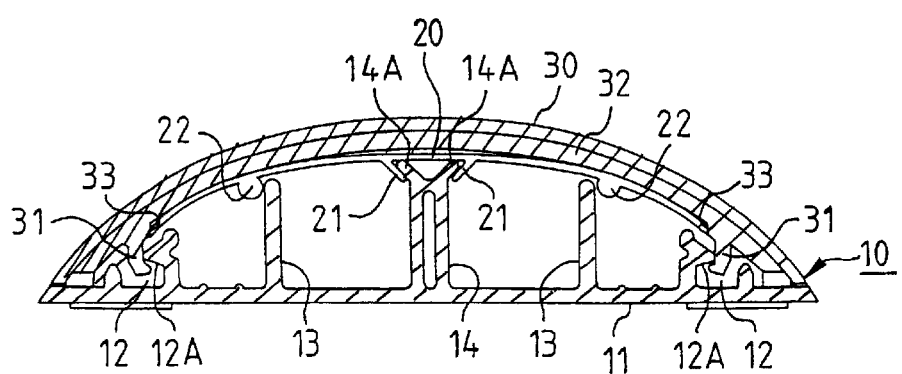
FIG. 3 is an end view of the accessory shown in FIG. 2 with the joint-cover fitted over the base section of the trunking.

FIGS. 1 to 3 show trunking 10 for routing electrical cables, not shown.

The trunking is known in the art and is used to support, house and protect various devices, in particular various electrical devices, and to house conductors electrically connected to those devices.

In the usual way, it includes a base section 11 which in this example is essentially straight and is provided internally with a plurality of compartments or ducts for housing said electrical cables and mounting electrical devices or supports for electrical devices.

In this embodiment the base section 11 has a longitudinal central partition 14 which divides it into two equal parts and two lateral partitions 13 parallel to said central partition 14, one on each side of the central partition 14. A compartment for routing electrical conductors or cables is defined between the central compartment 14 and each of the lateral compartments 13.

Near its longitudinal edges the base section 11 of the trunking 10 further includes groove means 12 adapted to accommodate clips 15A of a length of cover section 15 closing the trunking 10.

To be more precise, the clips 15A on the length of cover section 15 hook over a wall 12A of the groove means 12 provided on the base section 11 of the trunking 10.

In this embodiment the length of cover section 15 has a curved or bulging profile espousing the envelope curve of the tops of the various partitions 13, 14 carried by the base section 11 of the trunking 10.

Of course, in a different embodiment, not shown, the closure cover section could have a straight or plane profile espousing the plane envelope curve of the tops of the partitions carried by the base section of the trunking.

As shown in FIGS. 1 to 3, at the interruption in the length of cover section 15 there is provided a finishing accessory which in this embodiment is a joint attached to the base section 11 of the trunking 10 to assure continuous protection of electrical conductors or cables between the length of cover section 15 and another length of cover section, not shown, or another member, such as an end-piece for terminating the trunking or an electrical device support.

The accessory inside the trunking 10 masks any longitudinal gap beyond the edge 15B of the length of cover section 15.

The accessory advantageously includes an elastically deformable wall 20 which in this embodiment extends over the greater part of the width of the base section 11 of the trunking 10. The wall 20 is adapted to deform elastically to assume two different configurations. In a first configuration shown in FIGS. 1 and 2 at least a portion 20A of the wall 20 is at the same level as the cover section 15 and in a second configuration shown in FIG. 3 the wall 20 is at a lower level than the cover section 15.

In this embodiment, in which the accessory is associated with a cover section with a bulging shape, the wall 20 forming the joint has a plane shape in its first configuration (see FIGS. 1, 2 and 4) and a bulging shape in its second configuration espousing that of the associated cover section 15 (see FIG. 3).

Figure 4:
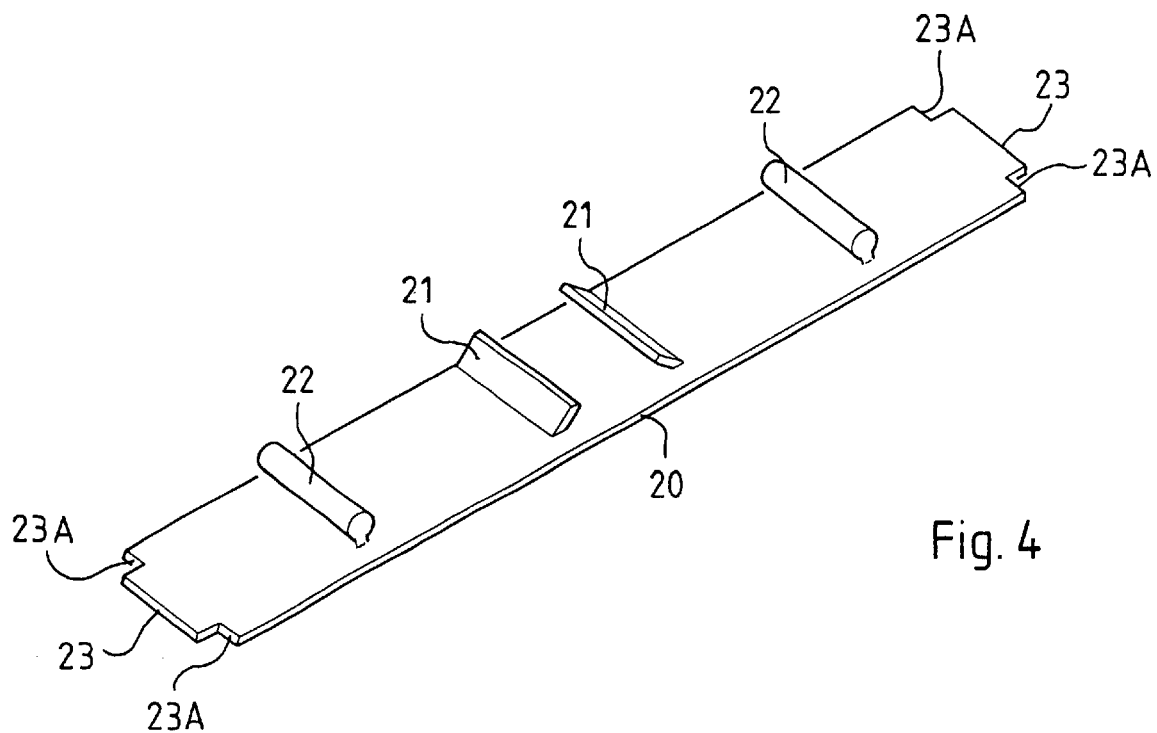
FIG. 4 is a bottom view of the wall forming the joint of the accessory according to the invention.

To be more precise, in its first configuration the wall 20 has an essentially rectangular shape with a podium-shape profile 23 at each end including steps 23A on either side of the top step of the podium 23 (see FIG. 4).

As shown in FIGS. 1 and 2, in its first configuration, the wall 20 has a central part 20B below the cover section 15 and two end parts 20A level with the cover section 15. The two end parts 20A extend either side of the central part 20B of the wall. Each of the end parts 20A represents approximately more than one third of the length of the wall 20 so that the wall 20 in its first configuration is for the most part at the same level as the cover section 15.

The wall 20 forming the joint also carries on its inside face, which faces toward the back of the base section 11 of the trunking, attachment means for attaching it to the end of the central partition 14 provided on the base section 11.

The attachment means take the form of clipping means which advantageously include two facing tongues 21 projecting from the inside face of the wall 20, to which they are inclined.

The tongues 21 cooperate with the complementary ends 14A of the central partition 14 of the base section 11 of the trunking (see FIG. 1).

The inside face of the wall 20 carries two beads 22, one on each side of the tongues 21, extending over the width of the wall 20 and positioned against the partitions 13 carried by the base section 11 of the trunking 10 when the wall 20 assumes its bulging second configuration (see FIG. 3). The bearing of the beads 22 on the wall 20 against the partition 13 of the base section 11 of the trunking 10 limits the deformation of the wall 20 so that its deformation remains elastic deformation.

The wall 20 forming the joint is preferably molded from a plastics material. The beads 22 are advantageously used to assist ejection of the wall from the mold in which it is manufactured.

The accessory shown in FIGS. 2 and 3 further includes a joint-cover 30 to cover the wall 20 forming the joint, the edge 15B of the length of cover section 15 and an edge of another member, not shown, those edges being positioned one on each side of the joint, to form a continuous outer wall between the length of cover section and the other member.

The other member can be another length of cover section for closing the trunking, an end-piece for terminating the trunking or a support for an electrical device.

In this embodiment the joint-cover 30 has a bulging shape espousing that of the length of cover section 15.

The joint-cover 30 has near each end of its inside face, which faces toward the base section 11 of the trunking, two clips 31 which cooperate with the groove means 12 provided on the base section 11 of the trunking to fix the joint-cover 30 to the base section of the trunking.

Figure 5:
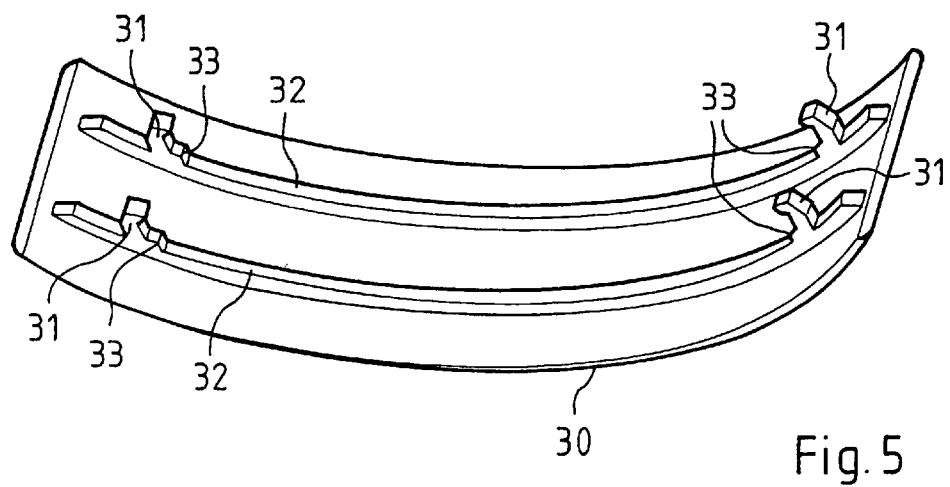
FIG. 5 is a bottom view of the joint-cover associated with the wall forming the joint shown in FIG. 4.

The clips 31 of the joint-cover 30 are carried by parallel ribs 32 extending from one end to the other of the joint-cover over the greater part of its length, conferring some stiffness on it (see FIG. 5).

As shown in FIG. 3 in particular, the wall 20 forming the joint has, in its second configuration, a shape espousing that of the cover section and a length less than that of the joint-cover 30, so that it leaves uncovered the ends of the joint-cover 30 carrying the clips 31 so that they can engage freely in the groove means 12 provided on the base section 11 of the trunking 10.

Note that each step 23A at each end of the wall 20 forming the joint cooperates with a complementary step 33 at the base of each clip 31 of the joint-cover to lock the wall 20 forming the joint against the joint-cover 30 and prevent it from moving about inside the closed trunking.

The joint-cover 30 is also advantageously molded from a plastics material. It has an external appearance matching that of the cover section for closing the trunking.

Thus at an interruption of the cover section closing the trunking 10 that requires the installer to cut the cover section into lengths 15, if the installer decides to install a joint-cover 30, he can advantageously use the edge of the wall 20 forming the joint, positioned on the base section 11 of the trunking 10 in its first configuration, to mark the length of cover section to be cut so that the cut edges 15B of the lengths of cover section 15, when they are mounted on the base section of the trunking, are positioned against the wall 20 and leave between them at the most a gap equal to the width of that wall.

The installer than fits the joint-cover 30 to the wall 20, which deforms the wall elastically. The wall 20 deforms under the joint-cover 30, leaving uncovered the ends of the joint-cover 30 carrying the clips 31, enabling the joint-cover to be clipped onto the base section of the trunking. In this second configuration the wall 20 is beneath the cover section.

If the installer decides not to use a joint-cover, he can still use the wall 20 forming the joint to cut the lengths of cover section so that once positioned on the base section of the trunking they abut edge-to-edge. When the lengths of cover section are fitted, the wall 20 deforms elastically under them to espouse the shape of the length of cover section.

The wall 20 forming the joint is a safety feature in that it prevents access to the electrical conductors or cables at the interruption where two lengths of cover section abut edge-to-edge.

Of course, the present invention is in no way limited to the embodiment described and shown, and many variants conforming to the spirit of the invention will suggest themselves to the skilled person.

In particular, in another embodiment that is not shown, the wall forming the joint could have a bulging shape in its first configuration and an essentially plane shape in its second configuration espousing that of the associated cover section.

What is claimed is:

1. An accessory for attaching to a base section of a trunking for routing electrical cables or conductors, said trunking comprising a length of a cover section attached to said base section for closing said trunking, said accessory including a joint which is separate from said length of the cover section and which is adapted to be attached to said base section at an end of said length of cover section for masking any longitudinal gap beyond a transverse end edge of said length of the cover section, said joint being elastically deformable and being adapted to be deformed elastically, when mounted on said base section, between a first configuration in which at least a portion of said joint faces said transverse end edge of said length of the cover section and a second configuration in which said joint is at a level lower than the level of said transverse end edge of said length of the cover section.

2. The accessory as claimed in claim 1, wherein the length of the cover section has a bulging shape, said and a wall forming said joint has a plane shape in its first configuration and a bulging shape in its second configuration espousing that of the length of the cover section.

3. The accessory as claimed in claim 1, wherein the length of the cover section has essentially a plane shape, and a wall forming said joint has a bulging shape in its first configuration and a essentially plane shape in its second configuration espousing that of the the length of the cover section.

4. The accessory as claimed in claim 1, wherein a wall forming said joint carries on an inside face, which faces towards the back of said length of the cover section of said trunking, an attachment means for attaching it onto an edge of a partition of said base section.

5. The accessory as claimed in claim 4 wherein said attachment means are in the form of clipping means.

6. The accessory as claimed in claim 5 wherein said clipping means include two facing tongues projecting from said inside face of said wall forming said joint and inclined thereto.

7. The accessory as claimed in claim 1, further including a joint-cover adapted to cover a wall forming said joint, an edge of said length of the cover section, and an edge of another member, wherein said edges of said length of the cover section and another said member, are positioned on either side of said joint to form a continuous outside wall between said length of the cover section and said another member.

8. The accessory as claimed in claim 7 wherein said wall forming said joint in its second configuration is shorter than said joint-cover so that it leaves uncovered the ends of said joint-cover which carry clips which clip into groove means provided on said base section of said trunking.

9. The accessory as claimed in claim 7 wherein said joint-cover has a shape espousing that of said length of cover section.

10. The accessory as claimed in claim 1 wherein a said wall forming said joint extends over a greater part of the width of said base section of said trunking.

11. The accessory as claimed in claim 1 wherein a said wall forming said joint is molded from a plastics material.

* * * * *